United States Patent
Onda et al.

(10) Patent No.: US 10,619,013 B2
(45) Date of Patent: Apr. 14, 2020

(54) COMPOSITE PARTICULATE MATERIAL AND PRODUCTION PROCESS FOR THE SAME, COMPOSITE-PARTICULATE-MATERIAL SLURRY, AND RESINOUS COMPOSITION

(71) Applicant: ADMATECHS CO., LTD., Miyoshi-shi (JP)

(72) Inventors: Hiroyuki Onda, Miyoshi (JP); Nobutaka Tomita, Miyoshi (JP); Yuki Arai, Miyoshi (JP)

(73) Assignee: ADMATECHS CO., LTD., Miyoshi-shi (JP)

( * ) Notice: Subject to any disclaimer, the term of this patent is extended or adjusted under 35 U.S.C. 154(b) by 0 days.

(21) Appl. No.: 16/674,119

(22) Filed: Nov. 5, 2019

(65) Prior Publication Data
US 2020/0071471 A1    Mar. 5, 2020

Related U.S. Application Data

(63) Continuation of application No. PCT/JP2018/019119, filed on May 17, 2018.

(30) Foreign Application Priority Data

May 17, 2017    (WO) .................. PCT/JP2017/018530

(51) Int. Cl.
*C08J 3/12*    (2006.01)
*C08K 9/02*    (2006.01)
(Continued)

(52) U.S. Cl.
CPC ................. *C08J 3/12* (2013.01); *C08J 3/215* (2013.01); *C08K 9/02* (2013.01); *C08K 9/06* (2013.01);
(Continued)

(58) Field of Classification Search
CPC ........... C08J 3/12; C08J 2327/12; C08K 9/02; C08K 9/06
See application file for complete search history.

(56) References Cited

U.S. PATENT DOCUMENTS 3,911,072 A    10/1975 Saito et al.
4,391,763 A *    7/1983 Ueno .................. C08J 3/12
                                                  264/15
(Continued)

FOREIGN PATENT DOCUMENTS

JP    S49-35453 A    4/1974
JP    S62-83029 A    4/1987
(Continued)

OTHER PUBLICATIONS

International Search Report dated Jul. 24, 2018, in International Patent Application No. PCT/JP2008/019119 (w/ Computer-generated partial English translation).
(Continued)

*Primary Examiner* — Vu A Nguyen
(74) *Attorney, Agent, or Firm* — Oblon, McClelland, Maier & Neustadt, L.L.P.

(57) ABSTRACT

A composite material includes a resinous particulate material, and an inorganic particulate material having a particle diameter being smaller than that of the resinous particulate material, fused welded onto a surface of the resinous particulate material, formed of an inorganic oxide, and including OH groups generated by fuse welding in the surface. The composite particulate material exhibits a degree of sphericity of 0.8 or more, and a has volumetric average particle diameter of from 0.1 to 100 μm.

17 Claims, 9 Drawing Sheets

(51) Int. Cl.
  *C08K 9/06* (2006.01)
  *C08J 3/215* (2006.01)
(52) U.S. Cl.
  CPC ..... *C08J 2327/12* (2013.01); *C08K 2201/003* (2013.01)

(56) References Cited

U.S. PATENT DOCUMENTS

| | | | | |
|---|---|---|---|---|
| 4,828,955 | A | * | 5/1989 | Kasai ............... C08F 291/00 428/402.21 |
| 4,915,987 | A | * | 4/1990 | Nara ................... B01F 7/04 241/189.1 |
| 6,518,349 | B1 | | 2/2003 | Felix et al. |
| 2015/0030857 | A1 | * | 1/2015 | Shigenai ............... C08J 3/12 524/514 |

FOREIGN PATENT DOCUMENTS

| | | | |
|---|---|---|---|
| JP | 2002-540275 | A | 11/2002 |
| JP | 2012135866 | A * | 7/2012 |
| JP | 2015-134898 | A | 7/2015 |
| JP | 2016-124729 | A | 7/2016 |

OTHER PUBLICATIONS

Written Opinion of the International Searching Authority dated Jul. 24, 2018, in International Patent Application No. PCT/JP2008/019119 (w/ Computer-generated partial English translation).

Notification of Reasons for Refusal dated Aug. 27, 2019, in Japanese Patent Application No. 2019-518864 (w/ Computer-generated partial English translation).

Decision to Grant dated Sep. 26, 2019, in Japanese Patent Application No. 2019-518864 (w/ Computer-generated partial English translation).

* cited by examiner

COMPOSITE PARTICULATE MATERIAL AND PRODUCTION PROCESS FOR THE SAME, COMPOSITE-PARTICULATE-MATERIAL SLURRY, AND RESINOUS COMPOSITION

CROSS REFERENCE TO RELATED APPLICATIONS

The present application is a Continuation Application of International Application No. PCT/JP2018/019119, filed on May 17, 2018, which is incorporated herein by reference. The present invention is based on PCT/JP2017/018530, filed on May 17, 2017, the entire contents of which are incorporated herein by reference.

BACKGROUND OF THE INVENTION

1. Field of the Invention

The present invention relates to a composite particulate material which is formed by fuse welding an inorganic particulate material onto a surface of a particulate material composed of resin and is mixed and used in a resinous composition for electronic material, and a production process for the same; and further to a composite-particulate-material slurry and resinous composition which contain the composite particulate material.

BACKGROUND ART

2. Description of the Related Art

For the purpose of upgrading electric characteristics by the addition of dissimilar raw materials, stabilizing dimensions after curing, and the like, it has been carried out conventionally to use a particulate material composed of resin (which will be hereinafter referred t as "resinous particulate material" in the present specification) as a filler in a resinous composition before undergoing curing (or prior-to-curing resinous composition). For example, fluorine resins with C—F bonds have been used to upgrade electric characteristics.

Usually, many of resinous particulate materials are poor in the affinity to organic solvents, organic materials, and the like, and are moreover even less likely to undergo surface modifications.

Hence, the present applicant proposes a composite particulate material comprising a resinous particulate material, which is made of polytetrafluoroethylene (or PTFE) and whose surface is covered with an inorganic particulate material composed of silica, in Japanese Unexamined Patent Publication (KOKAI) Gazette No. 2016-124729. It is easy to give required performance to a mineral making up the inorganic particulate material by subjecting it to surface treatments with silane coupling agents, and the like, so that such an effect can be expected as upgrading its affinity to prior-to-curing resinous compositions to be mixed, for instance.

SUMMARY OF THE INVENTION

The composite particulate material disclosed in Japanese Unexamined Patent Publication (KOKAI) Gazette No. 2016-124729 can be upgraded in the dispersibility into solvents, and the like; however, unnecessary stresses might have remained in obtained composite particulate materials, because they were made by a method in which the inorganic particulate material was embedded in the resinous particulate material in the surface by an external force. Moreover, the obtained composite particulate materials were found to be inferior in the adhesiveness to resinous compositions, because the inorganic particulate material, which was simply embedded in the resinous particulate material by pressing, was not sufficiently joined to the resinous particulate material. As a result, the obtained composite particulate materials, which were used for the application of electronic materials, were found that they were lowered in the affinity to metals used in wiring.

The present invention has been completed in view of the aforementioned circumstances. It is therefore a to-be-achieved assignment to the present invention to provide a composite particulate material comprising an inorganic particulate material which is uniformly and solidly joined to a resinous particulate material in the surface, and a production process for the same.

As a result of investigations that the present inventors carried out earnestly in order to achieve the aforementioned assignment, the present inventors found out that fuse welding a resinous particulate material and an inorganic particulate material together allows them to uniformly and solidly join to each other, and concurrently permits OH groups, which effect such advantages as upgrading affinity to metals, to generate in the inorganic particulate material in the surface, thereby completing the following subject matters.

(1) A production process for composite particulate material according to the present invention achieving the aforementioned assignment comprises a fuse welding step of charging a resinous particulate material and an inorganic particulate material into a high-temperature atmosphere, whose temperature is a glass transition point or softening point or more of the resinous particulate material, in a manner of floating the resinous particulate material and inorganic particulate material float a medium composed of gas and/or liquid, thereby fuse welding the inorganic particulate material onto the resinous particulate material on a surface thereof. The fuse welding step is carried out under a condition where OH groups (hereinafter might possibly referred to as "superficial OH groups") generate in the inorganic particulate material in the surface. Note that it is one of suitable uses of the composite particulate material produced by the present production process to mix it in resinous compositions for electronic material that are used in contact with wiring made of metal.

Softening or dissolving the resinous particulate material in the surface to fuse weld the inorganic particulate material allows the materialization of solidly joining the resinous particulate material and inorganic particulate material to each other. Fuse welding the resinous particulate material and inorganic particulate together permits them to join to each other while keeping an after-mixing uniform state, because the fuse welding develops even without applying any external force. Fuse welding and/or agglomeration between constituent particles of the resinous particulate material are less likely to develop, because the resinous particulate material and inorganic particulate material are charged into the high-temperature atmosphere in a manner floating them in the medium.

(2) As a result of analyzing and/or investigating composite particulate materials produced by the production process according to the present invention, the following composite particulate material was invented. That is, a composite particulate material according to the present invention achieving the aforementioned assignment comprises: a resinous particulate material; and an inorganic particulate material whose particle diameter is smaller than that of the resinous particulate material, and which is fuse welded onto a surface of the resinous particulate material. The present composite particulate material satisfies conditions (a), (b) and (c) below: (a) exhibiting a degree of sphericity of 0.8 or more; (b) exhibiting a volumetric average particle diameter of from 0.1 to 10 µm; and (c) the inorganic particulate material is formed of an inorganic oxide, and includes OH groups generated by fuse welding in a surface thereof.

Note that it is one of suitable uses of the present composite particulate material to mix it in resinous compositions for electronic material that are used in contact with wiring made of metal.

In the present composite particulate material dispersed in a solvent or prior-to-curing resinous composition (or a prior-to-curing resinous composite undergone curing as well), or the like, the inorganic particulate material is less likely to come off from the resinous particulate material, because the inorganic particulate material is fusion welded onto the resinous particulate material on the surface. Moreover, the present composite particulate diameter is less likely to agglomerate, because it is able to inhibit its constituent resinous particles from resulting in agglomerating or turning into fibers. In addition, the present composite particulate material is characterized in the good after-curing adhesiveness when dispersed in a prior-to-curing resinous composition to constitute a resinous composition and used in contact with metal like copper materials.

The inorganic particulate material employed in the subject matters disclosed in above-described (1) and (2) preferably has a particle diameter that is from $\frac{1}{10}$ to $\frac{1}{100}$, more preferably from $\frac{1}{50}$ to $\frac{1}{5,000}$, to a particle diameter of the resinous particulate material. Setting the particle diameter of the inorganic particulate material within the range allows the inorganic particulate material to be more uniformly arranged on a surface of the resinous particulate material.

Moreover, a slurry in which the present composite particulate material is dispersed in a concentration of 20% by mass in methyl ethyl ketone is preferably free of any observable sea-island structure when one observes the slurry with an optical microscope. Note that it is possible to carry out the distinction between the presence and absence of sea-island structures by employing a concentration of 40% by mass, or 60% by mass. When a result of the distinction made with 40% by mass or 60% by mass employed differs from that made with 20% by mass, the latter result prioritizes over the former. The present composite particulate material free of any observable sea-island structure comprises the inorganic particulate material that adheres uniformly on a surface of the resinous particulate material. The inorganic particulate material adhering uniformly on the resinous particulate material in the surface acts uniformly on respective constituent particles of the present composite particulate material. Accordingly, the constituent particles become less likely to agglomerate so that they are uniformly dispersed in methyl ethyl ketone. Consequently, no sea-island structure comes to be observed. How to judge "whether being free of any sea-island structure or not" will be detailed in the "DESCRIPTION OF THE EMBODIMENTS" section.

The resinous particulate material is preferably formed of a fluorine resin. Fluorine resins are low in the affinity to solvents and prior-to-curing resinous compositions, and are likely to agglomerate as they are. However, turning them into a composite particulate material solidly covered with the inorganic particulate material allows inhibiting agglomerations from generating.

The inorganic particulate material is preferably undergone a surface treatment with a silane coupling agent. Carrying out a surface treatment with a silane coupling agent, which is provided with an appropriate functional group, upgrades the inorganic particulate material in the bondability to the resinous particulate material in the surface onto which it is fusion welded. Moreover, the surface treatment allows upgrading the resulting present composite particulate material in the affinity to solvents and prior-to-curing resinous compositions with which it is mixed, or in which it is dispersed. In addition, the surface treatment not only permits effectively inhibiting agglomerations, but also allows making bonds stronger between the present composite particulate material and prior-to-curing resinous compositions at the time of curing.

Moreover, the fuse welding step preferably brings the resinous particulate material into contact with the high-temperature atmosphere until the resulting present composite particulate material exhibits a degree of sphericity of 0.8 or more. Exposing the resinous particulate material to the high-temperature atmosphere allows the resinous particulate material to upgrade in the degree of sphericity, because the resinous particulate material exposed to the high-temperature atmosphere releases stresses to approach a sphere.

The composite particulate material and production process for the same according to the present invention, which are configured as described above, make it possible to provide composite particulate materials comprising a resinous particulate material and an inorganic particulate material solidly joined to a surface of the resinous particulate material. In particular, the present composite particulate material and production process allow the inorganic particulate material to be uniformly arranged on the resinous particulate material in the surface. As a result of enabling the inorganic particulate material to be uniformly and solidly joined to the resinous particulate material, the present composite particulate permits materializing a low viscosity, low dielectric characteristics and high adhesiveness when it makes up slurries, for instance.

DESCRIPTION OF THE EMBODIMENTS

Figure 1:
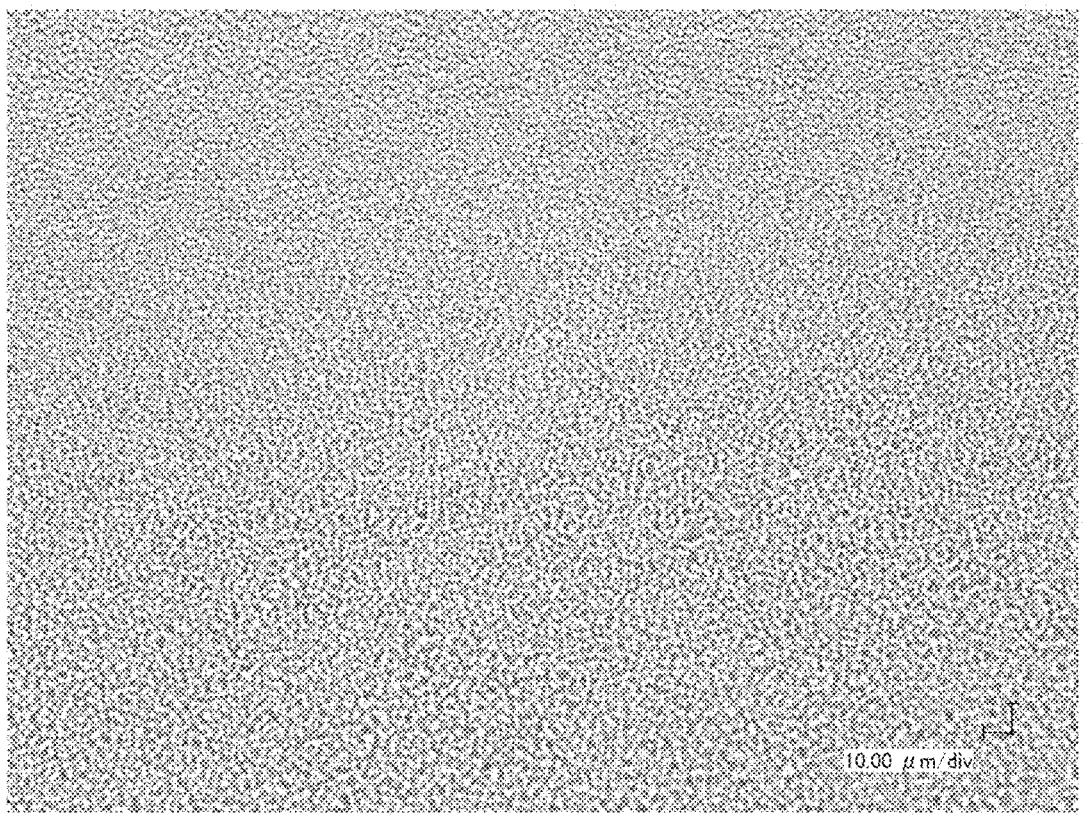
FIG. 1 is a photograph showing the results of an observation with an optical microscope wherein a slurry dispersion liquid according to First Example described in the "EXAMPLES" section was observed for how it was dispersed.

A composite particulate material and production process for the same according to the present invention will be hereinafter described in detail based on embodiments. A composite particulate material according to one of the present embodiments can be used as fillers to be dispersed in prior-to-curing resinous materials. The present composite particulate material can be added to prior-to-curing resinous compositions dispersing properties of a resinous material that the present composite particulate material contains. For example, the present composite particulate material, which comprises a fluorine resin with a low permittivity and is added to a prior-to-curing resinous composition, allows the prior-to-curing resinous composition undergone the addition to lower the permittivity. Moreover, the present composite particulate material, which is added to or dispersed in prior-to-curing resinous compositions composed of monomers or resinous precursors, permits inhibiting contractions accompanied by the curing prior-to-curing resinous compositions, thereby enabling precision members to be manufactured. The prior-to-curing resinous compositions to which the present composite particulate material can be added or in which it can be dispersed involve precursors of thermosetting resinous materials, such as epoxy resins, polyester resins, urea resins and silicone resins, namely, materials of these before curing and materials of these cured partially but exhibiting fluidity; monomers of thermoplastic resins, such as polyphenylene ether resins, modified polyphenylene ether resins, polyimde resins and liquid-crystal polymer resins; and molten substances made by heat melting the thermoplastic resins. The present composite particulate material can be mixed with and used in resinous compositions for electronic material that are used in contact with wiring made of metals, because it is good in the adhesiveness to the metals configuring the wiring.

(I) Composite Particulate Material

A composite particulate material according to the present embodiment comprises a resinous particulate material, and an inorganic particulate material. The inorganic particulate material is fuse welded onto a surface of the resinous particulate material. An abundance ratio between the inorganic particulate material and the resinous particulate material is not at all restricted especially. The inorganic particulate material fuse welded onto the resinous particulate material on the surface reforms the resinous particulate material in the surface. In addition to the present composite particulate material, the inorganic particulate material and resinous particulate material, which are liberated, may further exist as well. The present composite particulate material has a particle diameter of from 0.1 μm to 100 ρ m. In particular, the present composite particulate material dispersed and used in a resinous composition is preferably virtually free of containing any particles (or coarse grains) that have a particle diameter greater than that of the smallest interspaces at sites into which the resinous composition is filled. For example, an upper limit of the content of coarse grains is preferably set at 1,000 ppm, 500 ppm, 200 ppm, 100 ppm, or 50 ppm. The present composite particulate material preferably contains coarse grains with 50 μm or more in particle diameter in an amount of 1,000 ppm or less, more preferably 500 ppm or less, much more preferably 200 ppm when the resinous composition is filled into interspaces with 50 μm in size, for instance.

The inorganic particulate material is preferably uniformly arranged on a surface of the resinous particulate material. The presence or absence of sea-island structure in the slurried present composite particulate material allows judging whether or not the inorganic particulate material is uniformly arranged onto the resinous particulate material on the surface.

Whether or not a sea-island structure exists is judged by observing a slurry, which is prepared by dispersing the present composite particulate material in a concentration of 20% by mass in methyl ethyl ketone, with an optical microscope. No sea-island structure is observed when the present composite particulate material is uniformly dispersed in the methyl ethyl ketone. In contrast, parts composed of the methyl ethyl ketone, and other agglomerated parts composed of a composite particulate material make observable sea-island structures when the composite particulate material is agglomerated. Therefore, it is possible to judge that no agglomeration occurs so that the present particulate material is uniformly dispersed when no sea-island structure is observed. The observation for the judgement on the absence or presence of sea-island structure is carried out in a viewing field whose size is from 100 times to 1,000 times approximately as great as a particle diameter that the present composite particulate material has. In particular, the observation is carried out in a viewing field that is 200 times greater based on the particle diameter of the present composite particulate material.

The resinous particulate material is made of particles comprising a fluorine resin. That is, the resinous particulate material comprises a fluorine resin that softens or melts when being heated. Although the fluorine resin is not at all restricted especially, an exemplifiable fluorine resin involves polytetrafluoroethylene (or PTFE), perfluoralkoxy alkane (or PFA), perfluoroethylene-propylene copolymer (or FEP), ethylene-tetrafluoroethylene copolymer (or ETFE), polyvinylidene fluoride (or PVDF), polychlorotrifluoroethylene (PCTFE), ethyelen-chlorotrifluoroethylene copolymer (or ECTFE), tetrafluoroethylene-perfluoro dioxyolane copolymer (or TFE/PDD), and polyvinylfluoride (or PVF). Note that two or more members of these fluorine resins may be used.

The particle diameter of the resinous particulate material is not at all restricted especially, because its appropriate size and grain size distribution change depending on its applications. However, the particle diameter of the resinous particulate material is selected so as to put the particle diameter of the present composite particulate material within the above-described range. For example, a possible particle diameter of the resinous particulate material is set to fall in a range of from 0.05 µm to 100 µm approximately. When the present composite particulate material is employed as fillers used in materials for electronic part, it is also preferable to eliminate constituent particles of the resinous particulate material in advance, constituent particles which have a particle diameter greater than a predetermined size. A method of controlling the particle diameter is not at all restricted especially. However, a method of cutting a resinous material into fine pieces by physical action like pulverization and then classifying the resultant fine pieces leads to obtaining the resinous particulate material provided with a required grain size distribution, whereas emulsion polymerization or suspension polymerization even allows the as-prepared resinous particulate material so as to inherently have a necessary grain size distribution from the beginning. The present composite particulate material exhibits a degree of sphericity of 0.8 or more, preferably 0.85 or more, more preferably 0.9 or more. The higher the degree of sphericity is the more preferable the present composite particulate becomes.

In order to upgrade the degree of sphericity, an available method is a method of charging a resinous particulate material into a high-temperature atmosphere after adjusting the resinous material to exhibit a proper grain size distribution. For charging the resinous material into a high-temperature atmosphere, an available method is the same method of charging as that of charging a resinous particulate material into a high-temperature atmosphere that is carried out at a fuse welding step in a later-described production process. Moreover, selecting a condition where the resinous particulate material melts sufficiently at the later-described fuse welding step also allows the present composite particulate material to upgrade in the degree of sphericity.

The inorganic particulate material fuse welds onto a surface of the resinous particulate material. A step of fuse welding (or a fuse welding step) is carried out by processing the inorganic particulate material and resinous particulate material at a high temperature under a condition where the inorganic particulate material exists on the resinous particulate material in the surface. The high-temperature processing generates OH groups in a surface of the inorganic particulate material. An exemplifiable amount of the OH groups existing in the surface of the inorganic particulate material is from 0.1 to 30 µmol/m$^2$. An exemplifiable lower limit value of the amount of the OH groups involves 0.1 µmol/m$^2$, 0.5 µmol/m$^2$, or 1 µmol/m$^2$. An exemplifiable upper limit value of the amount of the OH groups involves 30 µmol/m$^2$, 25 µmol/m$^2$, or 20 µmol/m$^2$. These upper limit values and lower limit values are combinable at one's discretion, and forming ranges defined by the upper limit values and lower limit values upgrades adhesiveness.

A processing temperature at the fuse welding step is a temperature allowing the resinous particulate material to melt in at least some of the surface. For example, the processing temperature is set at a softening point or more of a resinous material making up the resinous particulate material, or further at a melting point or more of the resinous material. Alternatively, a to-be-employed processing temperature may be a temperature at which OH groups generate in a surface of the inorganic particulate material. For example, a preferable processing temperature is set at 400° C. or more when silica or alumina is employed as the inorganic particulate material.

The phrase, "fuse welding (or being fuse welded)," refers to such a state as the resinous particulate material deforms in some of the surface to copy an outer shape of the inorganic particulate material. In particular, it is also possible to judge that fuse welding is securely performed when a later-described method, which measures the present composite particulate material for a content of inorganic particles, yields values that are a predetermined value or more. A possible predetermined value to be set up involves 1 mg/m$^2$, 3 mg/m$^2$, 5 mg/m$^2$, 10 mg/m$^2$, or 50 mg/m$^2$. The larger the predetermined value is, the more preferable the present composite particle becomes. Moreover, no sea-island structure is preferably observed (note that the present composite particulate material is judged to be capable of re-dispersing in this instance) even after a washing operation is carried out three times in a later-described measurement method for the content of inorganic particles.

The inorganic particulate material has a smaller particle diameter than that of the resinous particulate material. A mineral making up the inorganic particulate material is not all restricted especially, but an employable mineral involves inorganic oxides, such as silica, alumina, zirconia and titania, and composite oxides of these inorganic oxides. Moreover, the inorganic particulate material may further include an organic substance. For example, a to-be-given inorganic particulate material including an organic substance involves silicone oils, silicic acid aqueous solutions, aqueous solutions such as those of tetraethyl orthosilicate, and particles such as those of silicone resins. The particle diameter of the inorganic particulate material is smaller than that of the resinous particulate material. A way how to control the particle diameter of the inorganic particulate material is not at all restricted especially, but the following methods allow the inorganic particulate material to exhibit a targeted grain size distribution: combining mechanical methods, such as pulverization and classification; or synthesizing a mineral making up the inorganic particulate material by a sol-gel method or hydrothermal method and then turning the resulting mineral into particulate shapes.

A preferable particle diameter of the inorganic particulate material is from 1/10 to 10,000, or more preferably from 1/50 to 1/5,000, to the particle diameter of the resinous particulate material taken as the basis. Specific numerical values are exemplified as follows: a to-be-given lower limit value of the particulate diameter involves 1 nm, 3 nm, 5 nm, 10 nm, 15 nm, 20 nm, 30 nm, 50 nm, 80 nm, or 100 nm; and a to-be-given upper limit value involves 1 µm, 800 nm, 500 nm, 300 nm, 200 nm, 150 nm, or 100 nm.

The inorganic particulate material may also be undergone a surface treatment with a silane compound having Si—H bond. Moreover, the surface treatment may even be carried out after completing the present composite particulate material. The silane compound involves silane coupling agents, silazanes, and silicone having an organopolysiloxane structure in the molecule. A preferable silane compound involves compounds having at least one member selected from the group consisting of phenyl groups, vinyl groups, epoxy groups, methacrylate groups, amino groups, phenyl amino groups, ureide groups, mercapto groups, isocyanate groups, acrylic groups, fluorinated alkyl groups, and alkyl groups. Among the silane compounds, one of exemplifiable silazanes involves 1,1,1,3,3,3-hexamethyldisilazne. Moreover, the inorganic particulate material may even be undergone a surface treatment with titanates or aluminates. It is possible to carry out the surface treatment for the following purposes: upgrading the inorganic particulate material in the affinity to the above-described resinous particulate material; and upgrading the inorganic particulate material in the affinity to objective materials (e.g., resinous materials and solvents) in which the composite particulate material according to the present embodiment is used. The surface treatment is preferably carried out using a silane compound in such an extent of amount as being capable of reacting with all of the OH groups existing in the inorganic particulate material in the surface; however, the OH groups may even remain eventually.

(II) Production Process for Composite Particulate Material

A production process for composite particulate material according to the present embodiment is a production process capable of producing the above-described present composite particulate material suitably. The present production process for composite particulate material comprises a fuse welding step, and the other steps employed if needed.

The fuse welding step is a step at which a resinous particulate material softens so that an inorganic particulate material adhering on a surface of the resinous particulate material is fuse welded onto the resinous particulate material. As a temperature at which the resinous particulate material softens, a melting point of the resinous particulate material is available, but an employable temperature also involves a glass-transition point or softening point, namely, temperatures lower than the melting point. The inorganic particulate material and resinous particulate material are charged into a high-temperature atmosphere exhibiting one of the temperatures or more. A specific and preferable temperature for the fuse welding step has been already described as above.

The high-temperature atmosphere is formed of a gas. An employable gas is not at all restricted especially, but involves air, oxygen, nitrogen, or argon. It is possible to use the same inorganic particulate material and resinous particulate material as those available for the above-described present composite particulate material. Therefore, no further descriptions on the inorganic particulate material and resinous particulate material will be made hereinafter.

The inorganic particulate material and resinous particulate material may also be turned into a mixture in advance and are then charged into the high-temperature atmosphere simultaneously, or may even be charged into it independently of each other. Embedding the inorganic particulate material into the resinous particulate material in the surface by a mechanochemical method with a compositing apparatus or pulverizing apparatus before the fuse welding step allows bonds to strengthen between the resinous particulate material and the inorganic particulate material in the subsequent fuse welding section. Burying the inorganic particulate material in the resinous particulate material in the surface might cause stresses in the resinous particulate material, but the generated stresses come to be cancelled by heating the resinous particulate material to such a temperature as its resinous material softens at the fuse welding step.

A method of materializing the high-temperature atmosphere is not at all restricted especially, but it is possible to heat and use a gas (such as air, oxygen, nitrogen or argon) making up the high-temperature atmosphere. A method of heating is not at all restricted especially, but it is possible to use flames, or electronic techniques.

For example, as a heat source for the method of heating, a flame, which is generated by burning a combustible gas such as propane gas, utility gas or acetylene gas, may also be used. Moreover, the following may even be used: a mist into which an organic solvent, such as ethanol, octane or kerosene, is sprayed; or a flame generated by burning a vaporized gas. It is also possible to carry out the step of heating by directly bringing the inorganic particulate material and resinous particulate material into contact with the thus formed flame, or it is even possible to carry it out indirectly by using high-temperature air produced by heating air or the like with a flame. An exemplifiable specific heating device involves premixing burners, diffusion burning burners, and liquid incineration burners. For example, a commercially-available usable device may also involve "NANO-CREATOR FCM" produced by HOSOKAWA MICRON, and "HIGH-FREQUENCY INDUCTION THERMAL-PLASMA NANO-PARTICLE SYNTHESIZER TP-40020NPS" produced by NIHON DENSHI. Moreover, gases may even be used, gases which are warmed using as a heat source one of the following: "HIRAIWA TURBOJET DRIER," an air flow-type drier produced by HIRAIWA TEKKOHSHO; "FLASH JET DRIER," a continuous/spontaneous air flow-type drier produced by SEISHIN CORPORATION; "METEOR RAINBOW" produced by NIHON PNEUMATIC INDUSTRIES; and "MICRO-MIST SPRAY DRIER" intended for high-temperature heating and produced by FUJISAKI DENKI.

The inorganic particulate material and resinous particulate material are desirably charged in a manner of disintegrating from each other so that each of their respective constituent particles does not fuse weld to each other when they are charged into the high-temperature atmosphere. As a method of disintegrating the constituent particles from each other, a method of floating the constituent particles in a medium compose'd of a gas or liquid is employed. A mixed gas or liquid may also be used. A liquid employed for the medium allows effectively preventing the resinous particulate material from fuse welding to each other, because it inhibits the constituent particles from agglomerating before charging.

The operation, "charging the inorganic particulate material and resinous particulate material into the high-temperature atmosphere," can be naturally materialized by first preparing the high-temperature atmosphere and then putting the inorganic particulate material and resinous particulate material into the prepared high-temperature atmosphere; or by first putting the inorganic particulate material and resinous particulate material in a manner of floating (e.g., a manner of forming a fluid bed) in a medium and then raising a temperature of the medium to form the high-temperature atmosphere.

The resinous particulate material and inorganic particulate material are exposed to the high-temperature atmosphere at the fuse welding step for a time until the inorganic particulate material fuse welds onto the resinous particulate material on the surface and OH groups generate in the inorganic particulate material in the surface. It is possible to judge whether or not the inorganic particulate material fuse welds onto the resinous particulate material by whether or not the resinous particulate material softens even in some of the surface, or further by a slurried composite particulate material making the state where no sea-island structure is observed when observed by the above-described method. Note that the inorganic particulate material is judged to fuse weld onto the resinous particulate material on the surface when the high-temperature atmosphere has a temperature higher than the melting point of a resinous material making up the resinous particulate material. In particular, it is possible to set up the time for exposing the resinous particulate material and inorganic particulate material to the high-temperature atmosphere at the fuse welding step so that a later-described method of measuring a produced composite particulate material for the content of inorganic particles yields a value that is a predetermined content or more. A possible predetermined value to be set up involves 1 mg/m$^2$, 3 mg/m$^2$, 5 mg/m$^2$, 10 mg/m$^2$, or 50 mg/m$^2$. The larger the predetermined value is, the more preferable the produced composite particulate material becomes. Moreover, an amount of the OH generating at the fuse welding step is not all restricted especially, but is desirably set to fall in a range of from 0.1 to 30 μmol/m$^2$ based on a superficial area of the inorganic particulate material. In addition, employable upper and lower limit values for a preferable amount of the OH groups involve the above-described values, and are combinable at one's discretion.

Moreover, the resinous particulate material and inorganic particulate material may be brought into contact with the high-temperature atmosphere for a predetermined time or more during which the heated resinous particulate material becomes spherical. The longer the predetermined time is, the more the heated resinous particulate material softens and/or melts, allowing the softened and/or melted resinous particulate material to become spherical by surface tension, or the like. Composite particulate materials produced by the present production process exhibit a degree of sphericity of 0.8 or more, preferably 0.85 or more, more preferably 0.9 or more. The higher the degree of sphericity is the more preferable the produced composite particulate materials become.

(III) Measurement Methods of Degree of Sphericity and Content of Inorganic Particles The computation of a degree of sphericity of composite particulate materials is carried out by observing their images, which were taken with a scanning electron microscope (or SEM), employing "ImageJ," image analyzing software, which runs on a computer and is developed by THE U.S. NATIONAL INSTITUTES OF HEALTH. The computation of a degree of sphericity comprises the steps of: taking a photograph of a composite particulate material with an SEM so that respective constituent particles of the composite particulate material are observed in a quantity of 100 on the resulting SEM photograph; analyzing one of the 100 constituent particles for the area and circumferential length; computing a value by an equation, (Degree of Sphericity)={4π×(Area)÷(Circumferential Length)$^2$}, using the observed area and circumferential length. The closer the computed value approaches one, the more the constituent particle approximates a true sphere. The computation is repeated for all of the other 99 constituent particles to compute their degree of sphericity, and an average value of the resulting degrees of sphericity is employed as a degree of sphericity of the composite particulate material.

The composite particulate material according to the present embodiment developed this time around is also capable of making a pelletized raw material for compression molded product after being subjected to molten kneading using a kneader.

A content of inorganic particles is computed by a method described below. The method comprises the steps of: mixing a composite particulate material in an amount of 100 g in 200-mL methyl ethyl ketone; subjecting the resulting mixture to a washing operation three times; and thereafter drying collected supernatant liquids. Note that the washing operation comprises the steps of: irradiating the mixture with an ultrasonic wave with 40 kHz in frequency and 600 W in output for 5 minutes; thereafter subjecting the mixture to 10,000-rpm centrifugal separation for five minutes; and collecting a supernatant liquid. It is believed that most of dried residues are the inorganic particulate material, and that the washing operation has eliminated the residues from the composite particle material on the surface. Assuming that all of the added inorganic particulate material is fastened or physically adsorbed onto the resinous particulate material, a content of inorganic particles is computed by the following equations:

(Fastened Amount (in g))=(Addition Amount (in g))−(Amount of Dried Residues (or Physically-adsorbed Amount) (in g)); and (Content of Inorganic Particles (in mg/m$^2$))=(Fastened Amount (in g))÷{(Washed Specific Surface Area (in m$^2$/g))×1,000 (in g)}

Note herein that the collected supernatant liquids are dried under the conditions at 180° C. for one hour. The composite particulate material is measured for the specific surface area by BET method using nitrogen.

(IV) Degree of Hydrophobicity

The composite particulate material according to the present embodiment preferably exhibits a degree of hydrophobicity of 20 or more, more preferably 30 or more, or much more preferably 40 or more.

A method of measuring a composite particulate material for the degree of hydrophobicity comprises the steps of: putting a stirrer in a flask; put gauged 50-mL ion-exchanged water in the flask; gently floating a sample in an amount of 0.2 mg on the water surface; turning the stirrer; gently dropping methanol so as not to directly splash the methanol onto the sample; and depositing the sample. A degree of hydrophobicity is computed using the following equation from an amount of the dropped methanol when all the sample has deposited from the water surface.

(Degree of Hydrophobicity (in %))=100×(Amount of Dropped Methanol (in mL))÷{(50-mL Ion-exchanged Water}+{Amount of Dropped Methanol (in mL))}

EXAMPLES

First Example 100 parts by mass of polytetrafluorethylene (or PTFE) particles serving as a resinous particulate material, and three parts by mass of wet-produced silica particles serving as an inorganic particulate material were mixed with each other. The PTFE particles had undergone linseed-oil feeding in an amount of 22 g/100 g, and had a volumetric average particle diameter of 3.0 m. The wet-produced silica particles comprised silica synthesized by liquid-phase synthesis method, were capable of re-dispersing to primary particles in dried state, had a volumetric particle diameter of 10 nm, and exhibited a degree of hydrophobicity of 72. The resulting mixture was supplied in an amount of 1.0 kg/hour in a flow of air with a rate of 0.06 m³/minute to turn it into a floating state, and was then charged into a high-temperature atmosphere composed of 500° C. air and having a capacity 2 m³. Out of the charged mixture, 90 parts by mass could be collected as a composite particulate material. Comparing the IR spectrum of the mixture with that of the composite particulate material found that the peak of alkyl chains appearing at around from 2,800 $cm^{-1}$ to 3,200 $cm^{-1}$ decreased; whereas the peak of OH groups appearing at around from 3,600 $cm^{-1}$ to 3,800 $cm^{-1}$ increased. The collected composite particulate material was labeled a test sample according to First Embodiment.

The thus obtained test sample still exhibited the linseed-oil feeding amount of 20 g/100 g, but exhibited a degree of sphericity of 0.96 and a content of silica particles of 15 mg/m².

Moreover, the test sample was added to methyl ethyl ketone (or MEK) so as to make a slurry dispersion liquid in which the test sample accounted for 60% by mass.

The resulting slurry dispersion liquid was measured for the viscosity using a vibrating viscometer (e.g., "VISCO-MATE VM-100A" produced by SECONIC), and yielded a viscosity of 4 mPa·s. Moreover, no sea-island structure was observed.

Figure 7:
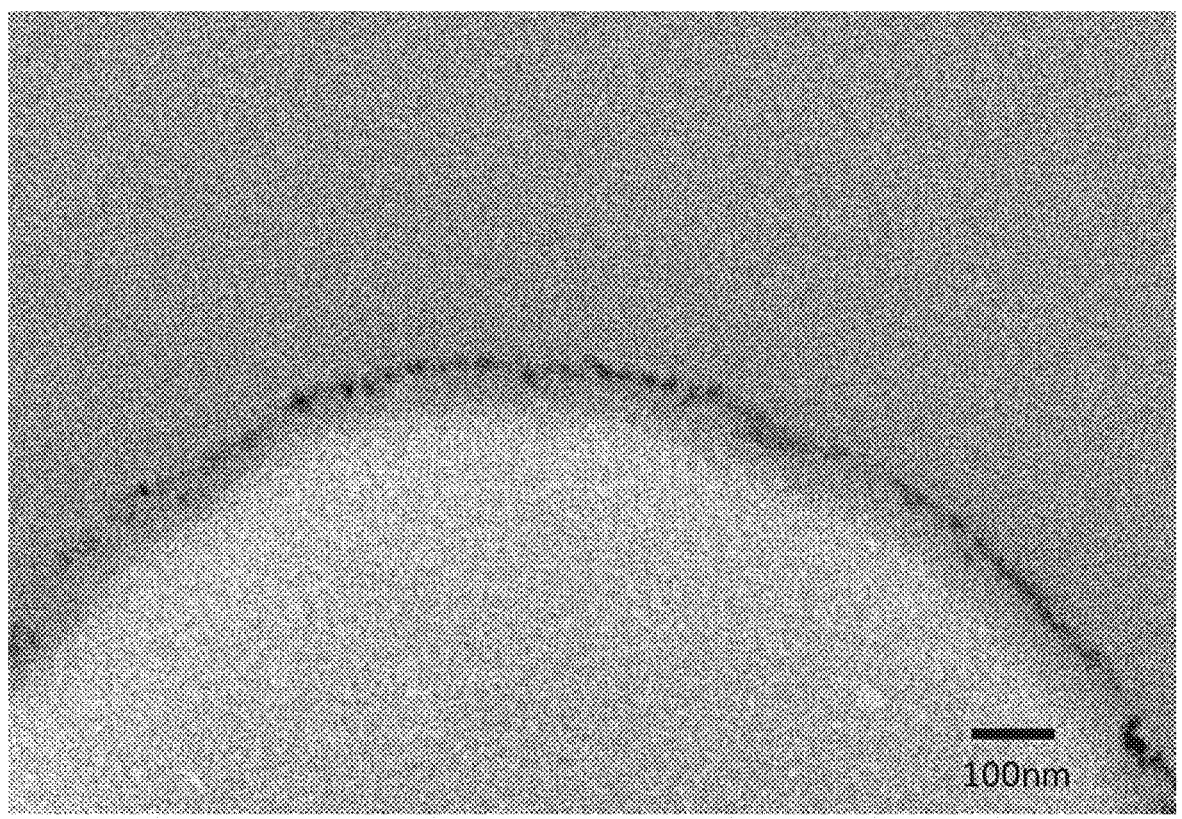
FIG. 7 is a transmission-electron-microscope (or TEM) image showing a cross section in the composite particulate material according to First Example.

The collected composite particulate material was kneaded into a thermosetting resin. Then, the thermosetting resin was thermally cured. FIG. 7 shows a photograph of the results of an observation with a transmission electron microscope (or TEM) on a section of the resulting thermally-cured substance which was cut with a microtome. The results confirmed that the silica was uniformly and solidly joined to the resinous particulate material on the outermost surface. The bright part in the particle shown in FIG. 7 is a part derived from the resinous particulate material, and the inorganic particulate material forms layers around the bright part in dense, adherent state. In contrast, no sufficient adhesiveness was exhibited between the resinous particulate material and the inorganic particulate material by the mixture which did not undergo the fuse welding step, and by a composite material in which the inorganic particulate material was buried in the resinous particulate material in the surface by mechanochemical processing.

Second Example

Except for altering the amount of the wet-produced silica particles to one part by mass, a test sample according to Second Example was produced under the same conditions as those of First Example.

Third Example

Except for altering the amount of the wet-produced silica particles to 0.3 parts by mass, a test sample according to Third Example was produced under the same conditions as those of First Example.

Fourth Example

A test sample according to Fourth Example was produced by preparing a mixture of 100 parts by mass of PTFE particles, which had a volumetric average particle diameter of 1.7 μm and served as a resinous particulate material, and 0.6 parts by mass of the wet-produced silica particles, which served as an inorganic particulate material, and then processing the resulting mixture under the same conditions as those of First Example.

Fifth Example

A test sample according to Fifth Example was produced by preparing a mixture of 100 parts by mass of PTFE particles, which had a volumetric average particle diameter of 0.5 g m and served as a resinous particulate material, and 10 parts by mass of the wet-produced silica particles, which served as an inorganic particulate material, and then processing the resulting mixture under the same conditions as those of First Example.

Sixth Example

Except for altering the amount of the wet-produced silica particles to six parts by mass, a test sample according to Sixth Example was produced under the same conditions as those of First Example.

Seventh Example

A test sample according to Seventh Example was produced by preparing a mixture of 100 parts by mass of PTFE particles, which had a volumetric average particle diameter of 50 μm and served as a resinous particulate material, and 0.3 parts by mass of the wet-produced silica particles, which served as an inorganic particulate material, and then processing the resulting mixture under the same conditions as those of First Example.

Eighth Example

A test sample according to Eighth Example was produced by preparing a mixture of 100 parts by mass of PTFE particles, which had a volumetric average particle diameter of 100 μm and served as a resinous particulate material, and 0.1 parts by mass of the wet-produced silica particles, which served as an inorganic particulate material, and then processing the resulting mixture under the same conditions as those of First Example.

Ninth Example

Except for altering the wet-produced silica particles to dry-produced silica particles that were synthesized by a gas-phase synthesis method and exhibited a degree of hydrophobicity of 47, a test sample according to Ninth Example was produced under the same conditions as those of Fifth Example.

Tenth Example

Except for altering the wet-produced silica particles to the dry-produced silica particles used in Ninth Example, a test sample according to Tenth Example was produced under the same conditions as those of First Example.

Eleventh Example

Except for altering the wet-produced silica particles to the dry-produced silica particles used in Ninth Example, a test sample according to Eleventh Example was produced under the same conditions as those of Fourth Example.

Twelfth Example

Except for altering the wet-produced silica particles to the dry-produced silica particles used in Ninth Example, a test sample according to Twelfth Example was produced under the same conditions as those of Seventh Example.

Thirteenth Example

Except for altering the wet-produced silica particles to the dry-produced silica particles used in Ninth Example, a test sample according to Thirteenth Example was produced under the same conditions as those of Eighth Example.

Fourteenth Example

A mixture of 100 parts by mass of PTFE particles, which had a volumetric average particle diameter of 3.0 ρ m and served as a resinous particulate material, and three parts by mass of the wet-produced silica particles, which served as an inorganic particulate material, was prepared. The mixture was then processed using a compositing facility. The compositing facility is based on a technology in which a resinous particulate material is modified and composited in the surface with an inorganic particulate material in wet mode by making use of a force mainly composed of impact forces while dispersing the mixture in a high-speed air flow.

The mixture processed via the compositing facility was used to produce a test sample according to Fourteenth Example under the same conditions as those of First Example. That is, the inorganic particulate material was mechanically joined to the resinous particulate material in the surface before the fuse welding step.

Fifteenth Example

Except for altering the wet-produced silica particles to wet-produced silica particles that had a particle diameter of 50 nm and exhibited a degree of hydrophobicity of 41, a test sample according to Fifteenth Example was produced under the same conditions as those of First Example.

Sixteenth Example

Except for altering the wet-produced silica particles to wet-produced silica particles that had a particle diameter of 100 nm and exhibited a degree of hydrophobicity of 41, a test sample according to Sixteenth Example was produced under the same conditions as those of First Example.

First Comparative Example

Except for not using the wet-produced silica particles but using the resinous particulate material alone, a test sample according to First Comparative Example was produced under the same conditions as those of First Example.

Second Comparative Example

A mixture of 100 parts by mass of PTFE particles, which had a volumetric average particle diameter of 3.0 μm and served as a resinous particulate material, and three parts by mass of the wet-produced silica particles, which served as an inorganic particulate material, was prepared. The mixture was then processed using the compositing facility to produce a test sample according to Second Comparative Example. Moreover, the produced test sample, namely, a recovered product, was added to MEK so as to make a slurry dispersion liquid in which the test sample accounted for 60% by mass.

The resulting slurry dispersion liquid was measured for the viscosity using the vibrating viscometer, and yielded a viscosity of 1,000 mPa·s.

Moreover, the viscosity measurement of another slurry dispersion liquid in which the test sample accounted for 40% by mass for the viscosity yielded a viscosity of 39.5 mPa·s.

Third Comparative Example 100 parts by mass of PTFE particles, which had a volumetric average particle diameter of 30 μm and served as a resinous particulate material, was added as they were to MEK so as to make a slurry dispersion liquid in which the PTFE particles accounted for 60% by mass. The viscosity measurement of the resulting slurry dispersion liquid yielded a viscosity of 1,000 mPa·s or more. Moreover, the viscosity measurement of another slurry dispersion liquid in which the PTFE particles accounted for 40% by mass for the viscosity yielded a viscosity of 506 mPa·s.

Figure 2:
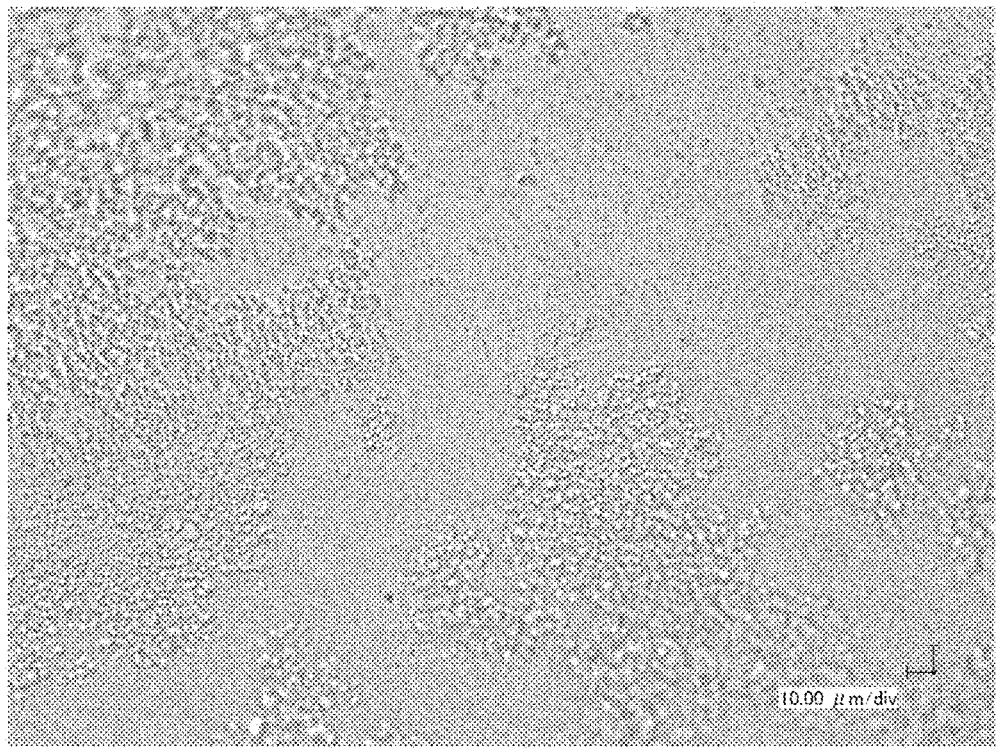
FIG. 2 is a photograph showing the results of an observation with an optical microscope wherein a slurry dispersion liquid according to Second Comparative Example described in the "EXAMPLES" section was observed for how it was dispersed.
Figure 3:
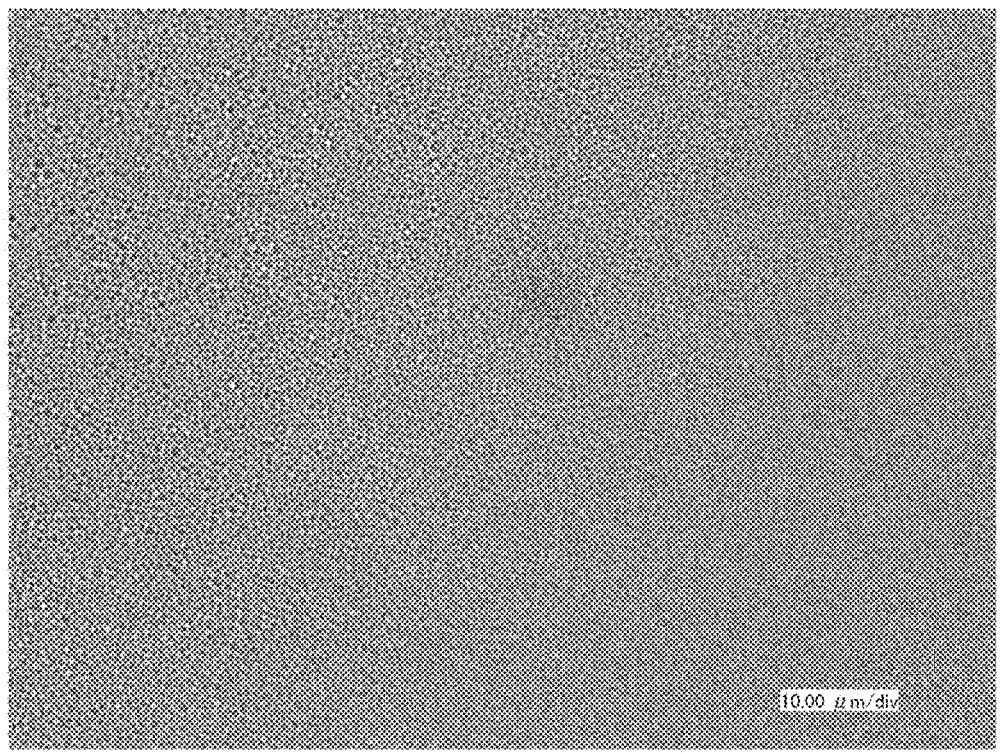
FIG. 3 is a photograph showing the results of an observation with an optical microscope wherein a slurry dispersion liquid, which was prepared using a washed composite particulate material according to First Example, was observed for how it was dispersed.
Figure 4:
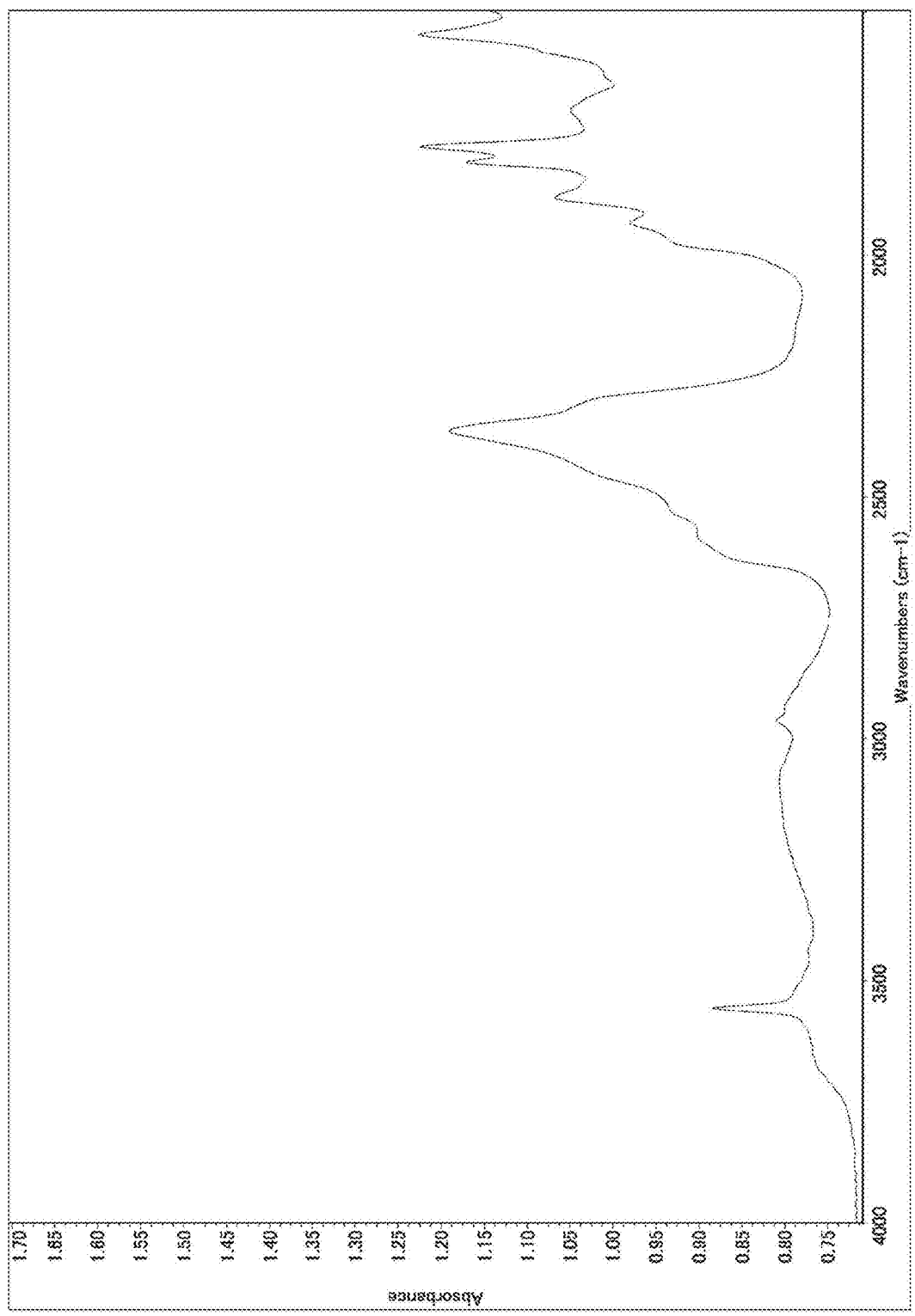
FIG. 4 is an infrared (or IR) spectrum illustrating the results of analyzing the washed composite particulate material according to First Example in the surface.

Table 1 shows the particle diameters of the resinous and inorganic particulate materials, mixing ratios and slurry-dispersion-liquid viscosities for the test samples according to First through Sixteenth Examples and First through Third Comparative Examples, and the presence or absence of sea-island structure in them. Note that the slurry dispersion liquids, in which the dispersants accounted for 60% by mass, were measured for the slurry-dispersion-liquid viscosity, and that, when the slurry dispersion liquids exhibited a viscosity beyond the measurable range of the viscometer, the other slurry dispersion liquids, in which the dispersants accounted for 40% by mass, were measured for the slurry-dispersion-liquid viscosity. Moreover, the presence or absence of sea-island structure was judged by observing slurries, in which the dispersants were dispersed in a concentration of 60% by mass in MEK, with an optical microscope with ×500 in magnification and 600 μm×600 μm in viewing field. FIGS. 1 and 2 show examples in which First Example and Second Comparative Example were judged for the presence or absence of sea-island structure, respectively. FIG. 1 shows that the composite particulate material was found to be uniformly dispersed in First Example, whereas FIG. 2 shows that a sea-island structure was found to be formed in Second Comparative Example, wherein island parts (which were formed by the agglomerated composite particulate material), and sea parts (in which the composite particulate material existed in low densities or did not exist at all) were separated from each other. Moreover, the composite particulate material according to First Example was washed three times by a washing operation comprising the steps of: dispersing the composite particulate material in an amount of 100 g in 200-mL MEK; irradiating it with an ultrasonic wave with 40 kHz in frequency and 600 W in output; subjecting it to 10,000-rpm centrifugal separation; and discarding the resulting supernatant liquid. The resultant washed products were capable of re-dispersing when they were made into an MEK slurry after the washing operation had been repeated three times. In addition, a slurry in which the washed products were dispersed in a concentration of 60% by mass in MEK was made, and was observed with an optical microscope. FIG. 3 shows an image obtained by the observation. Thus, First Example did not all form any sea-island structure in the same manner as before it was subjected to the washing operation. Moreover, the washed products were fed into an infrared (or IR) spectrum measuring apparatus to measure an IR spectrum in a wavenumber range of from 4,000 to 400 cm$^{-1}$. FIG. 4 illustrates the results of the measurement. The peaks, which appears in wavenumber ranges of from 3,000 to 2,800 cm$^{-1}$ and from 3,800 to 3,600 cm$^{-1}$, are peaks derived from silica. To sum up the above, the results shown in FIGS. 3 and 4 clarify that the silica particles exist on the PTFE particles even when being washed, and that the two are joined very solidly to each other.

being melted once); Second Comparative Example containing the mechanically-fixed inorganic particulate material more than that of Third Example but not undergone the fuse melting step; and Third Comparative Example neither containing the inorganic particulate material nor undergone the fuse welding step.

TABLE 1

| | Resinous Particulate Material | Inorganic Particulate Material | | | | | Content of Silica | Viscosity (mPa·s) | | |
|---|---|---|---|---|---|---|---|---|---|---|
| | Particle Dia. (μm) | Type | Particle Dia. (μm) | Parts by Mass | Fuse Welding Step | Degree of Sphericity | Particles (mg/m$^2$) | 60% by Mass | 40% by Mass | Sea-island Structure |
| 1st Ex. | 3 | Wet | 10 | 3 | Done | 0.96 | 15.0 | 4 | Not Applicable | Absent |
| 2nd Ex. | | | | 1 | | 0.98 | 6.2 | 17 | | |
| 3rd Ex. | | | | 0.3 | | 0.98 | 1.9 | 117 | | Present |
| 4th Ex. | 17 | | | 0.6 | | 0.92 | 4.6 | 5 | | Absent |
| 5th Ex. | 0.5 | | 10 | | | 0.91 | 7.8 | 200 | | |
| 6th Ex. | 3 | | | 6 | | 0.95 | 28.0 | 4 | | |
| 7th Ex. | 50 | | | 0.3 | | 0.90 | 6.0 | 4 | | |
| 8th Ex. | 100 | | | 0.1 | | 0.91 | 5.1 | 3 | | |
| 9th Ex. | 0.5 | Dry | 10 | | | 0.90 | 9.1 | 205 | | |
| 10th Ex. | 3 | | | 3 | | 0.94 | 13.0 | 5 | | |
| 11th Ex. | 17 | | | 0.6 | | 0.92 | 3.2 | 4 | | |
| 12th Ex. | 50 | | | 0.3 | | 0.90 | 4.5 | 3 | | |
| 13th Ex. | 100 | | | 0.1 | | 0.90 | 2.8 | 3 | | |
| 14th Ex. | 3 | Wet | 10 | 3 | Done and with Mechanical Pretreatment | 0.95 | 18.0 | 6 | Not Applicable | Absent |
| 15th Ex. | | | 50 | 0.6 | Done | 0.95 | 4.3 | 5 | | |
| 16th Ex. | | | 100 | 0.3 | | 0.95 | 3.5 | 5 | | |
| 1st Comp. Ex. | | | 10 | 0 | | 0.96 | 0.0 | 152 | | Present |
| 2nd Comp. Ex. | | | | 3 | Not Done but with Mechanical Pretreatment | 0.80 | 18.0 | 1,000 or more | 40 | |
| 3rd Comp. Ex. | | | | 0 | Not Done | 0.67 | 0.0 | 1,000 or more | 506 | |

As can be apparent from Table 1, First, Second, Fourth through Sixteenth Examples, namely, the composite particulate material comprising the inorganic particulate material fuse welded onto the resinous particulate material in the surface, were found that they did not form any sea-island structure at all, and that they were able to lower the slurry dispersion liquid, which contained the composite particulate material in an amount of 60% by mass, in the viscosity. Third Example was observed to form a sea-island structure, but it was found to be able to lower its slurry in the viscosity more than did any one of the following: First Comparative Example free from the inorganic particulate material but undergone the fuse welding step (or comprising the resinous particulate material solidified in some of the surface after Moreover, comparting the results produced by First through Third Examples with those produced by Sixth Example clarified that increasing the amount of the inorganic particulate material develops the lowering in the viscosity, and that even increasing the amount of the inorganic particulate material to a certain extent or more does not make it easy to further lower the viscosity. In addition, comparting the results produced by First Example with those produced by Fourth Example found that the addition of the inorganic particulate material depending on the superficial area of the resinous particulate material allows producing the comparable effects of lowering the viscosity. In addition, First Example comprised the inorganic particulate material in an addition amount that was largely comparable to that of Fourth Example based on (or per) the superficial area of the resinous particulate material, but in an apparent addition amount that differed from that of Fourth Example by five times approximately. Moreover, comparting the results produced by Second Comparative Example with those produced by Third Comparative Example found that the composite particulate material exhibiting a degree of sphericity of 0.8 or more is able to effectively inhibit the viscosity from rising.

Seventeenth Example

Vinyltrimethoxysilane (i.e., a silane coupling agent) was added in an amount of 0.02 parts by mass to 100 parts by mass of a powdery composite particulate material produced in accordance with First Embodiment, thereby subjecting the powdery composite particulate material to a surface treatment. The surface-treated powdery composite particulate material was washed with MEK to wash out the silane coupling agent not chemically bonded with the powdery composite particulate material, and was then dried to remove the MEK, thereby collecting a washed powder in an amount of 100 parts by mass. The resultant washed powder was measured for the IR spectrum.

Eighteenth Example

Except for altering the addition amount of the silane coupling agent to 0.1 parts by mass, a test sample according to Eighteenth Example was produced under the same conditions as those of Seventeenth Example.

Nineteenth Example

Except for altering the addition amount of the silane coupling agent to 0.2 parts by mass, a test sample according to Nineteenth Example was produced under the same conditions as those of Seventeenth Example.

Twentieth Example

Except for altering the addition amount of the silane coupling agent to 0.4 parts by mass, a test sample according to Twentieth Example was produced under the same conditions as those of Seventeenth Example.

Twenty-First Example

Except for altering the silane coupling agent to N-phenyl-3-aminopropyltrimethoxysilane, a test sample according to Twenty-first Example was produced under the same conditions as those of Nineteenth Example.

Twenty-Second Example

Figure 8:
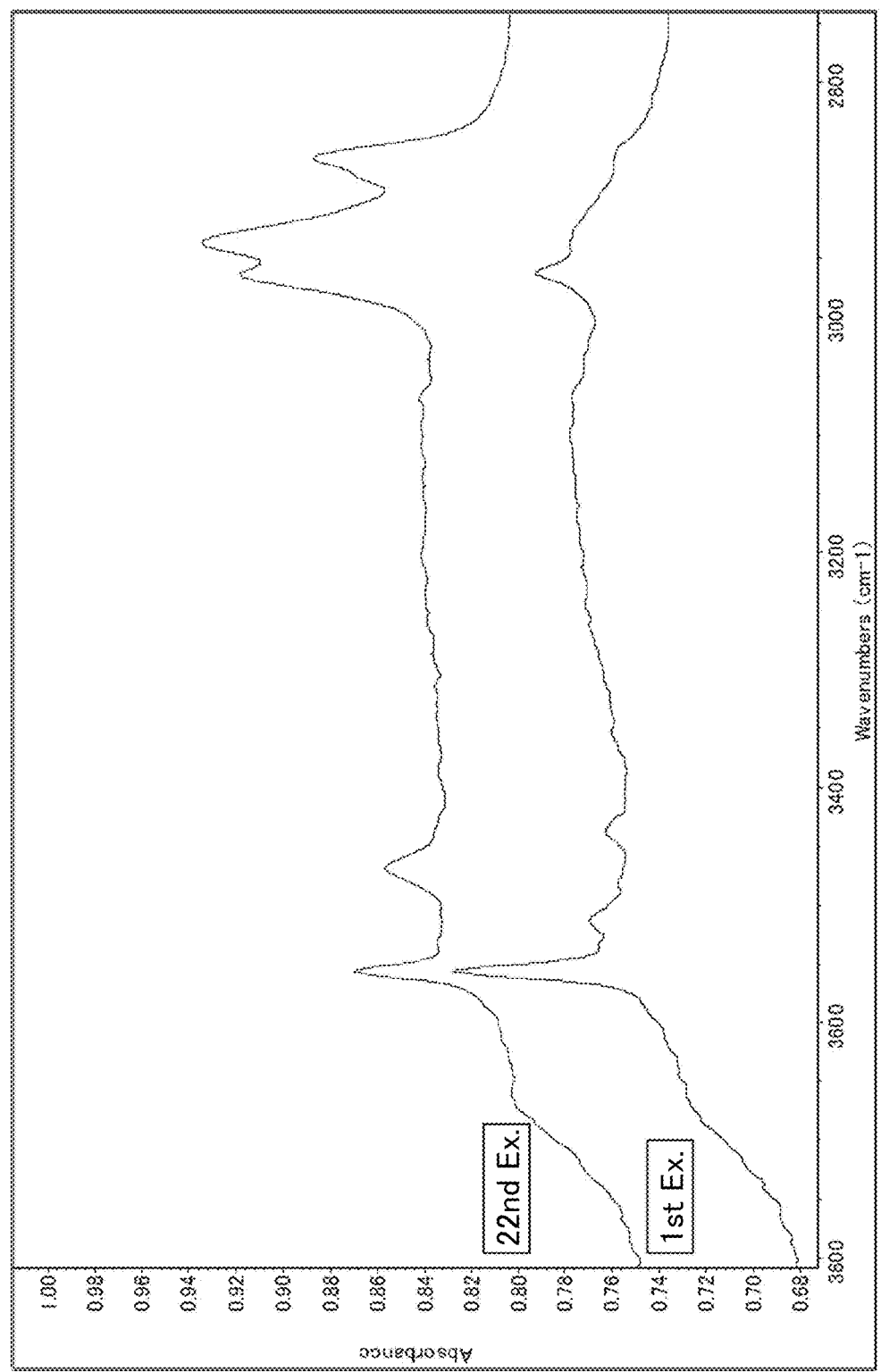
FIG. 8 is IR spectra illustrating the results of analyzing composite particulate materials according to First and Twenty-second Examples.

Except for altering the silane coupling agent to n-heptylamine, a test sample according to Twenty-second Example was produced under the same conditions as those of Nineteenth Example. FIG. 8 illustrates the results that the test sample according to Twenty-second Example produced in an IR spectrum measurement.

Since FIG. 8 shows the peaks of alkyl groups appearing at around 2,800 to 3,000 cm$^{-1}$ and the peaks of amino groups appearing at around 3,400 to 3,500 cm$^{-1}$ it is speculated that the treatment of the composite particulate material with a silane compound, such as the silane coupling agents, in the surface allows bonding the silane compound with the composite particulate material in the surface.

(i) Amount of Superficial OH Groups in Inorganic Oxide Particles

Figure 9:
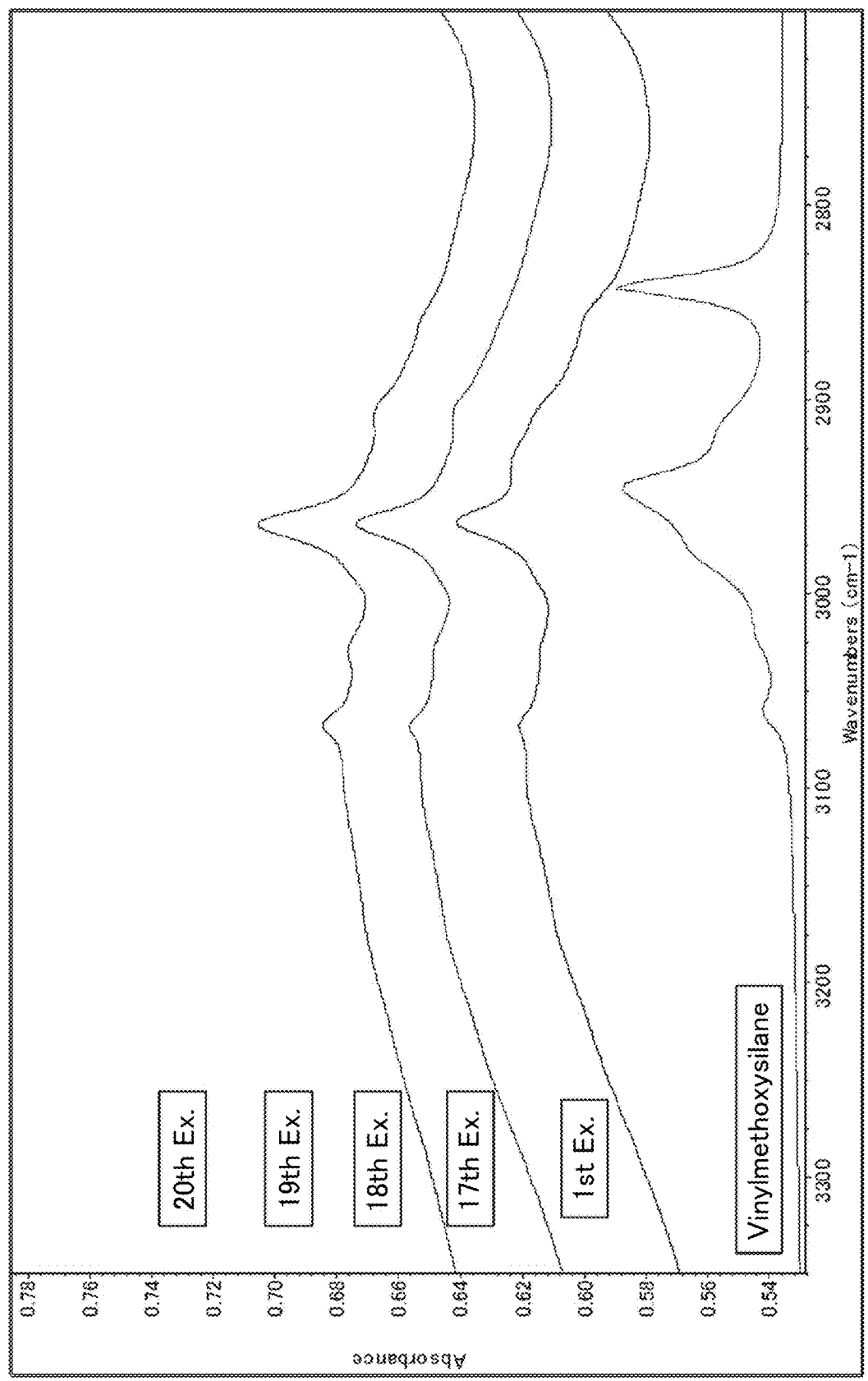
FIG. 9 is IR spectra illustrating the results of analyzing composite particulate materials according to First and Seventeenth through Twentieth Examples.

FIG. 9 illustrates the results that the powders made in Seventeenth through Twentieth Examples produced in an IR spectrum measurement. The peaks at around 2,800 to 3,100 cm$^{-1}$ led to taking 0.2 parts by mass of the silane coupling agent as an end point.

An amount of superficial OH groups was computed by the following equation. Note that the amount of superficial OH groups in the present specification is a value evaluated by a method described below.

(Amount of Superficial OH groups (in μmol/m$^2$))=
(Addition Amount of Silane Coupling Agent to
Composite Particulate Material (in mol/g))÷{
(Specific Surface Area of Composite Particulate
Material (in m$^2$/g))×1,000,000}

The results produced by Seventeenth through Twentieth Examples give the composite particulate material collected in First Example an amount of superficial OH groups of 5.2 g mol/m$^2$. Moreover, the results likewise give the composite particulate material collected in Fifteenth Example an amount of superficial OH groups of 19.3 μmol/m$^2$. In addition, the results likewise give the composite particulate material collected in Second Comparative Example an amount of superficial OH groups of 0.08 μmol/m$^2$. Comparing the amount of superficial OH groups given to First Example with that given to Second Comparative Example found that carrying out the fuse welding step in the presence of the inorganic particulate material generates OH groups in the inorganic particulate material in the surface.

(ii) Measurement of Resinous Composition for Viscosity

A composite particulate material-containing resinous composition was produced by adding 70 parts by mass of the composite particulate materials according to First, Nineteenth and Twenty-first Examples into 30 parts by mass of an epoxy resin, respectively. Note that the epoxy resin was a mixed epoxy resin of bisphenol type-A epoxy resin and bisphenol type-F epoxy resin (e.g., "ZX-1059" produced by SHIN NITTETSU KAGAKU Corporation). The resulting three resinous compositions were measured for the velocity when the shear rate was 1/s. Table 2 shows the results produced by the resinous compositions. Specifically, the viscosities were measured with "Discovery Hybrid Rheometer" produced by T. A. INSTRUMENT JAPAN Corporation.

Table 2 shows that subjecting the composite particulate materials to the surface treatment lowered the resinous compositions in the viscosity.

TABLE 2

|  | 1st Example | 19th Example | 21st Example |
|---|---|---|---|
| Silane Coupling Agent | None | Vinyltrimethoxysilane | N-Phenyl-3-Aminopropyl-trimethoxysialne |
| Addition Amount | Not Applicable | 0.2 Parts by Mass |  |
| Viscosity (Pa · s) | 1,444 | 1,045 | 1,199 |

(iii) Observation with SEM

The test samples according to First Example and First and Third Comparative Examples were observed with an SEM. FIGS. 5A and 5B, FIGS. 6A and 6B, and FIGS. 6C and 6D show the observation results that First Example, First Comparative Example and Third Comparative Example produced, respectively.

Figure 5A:
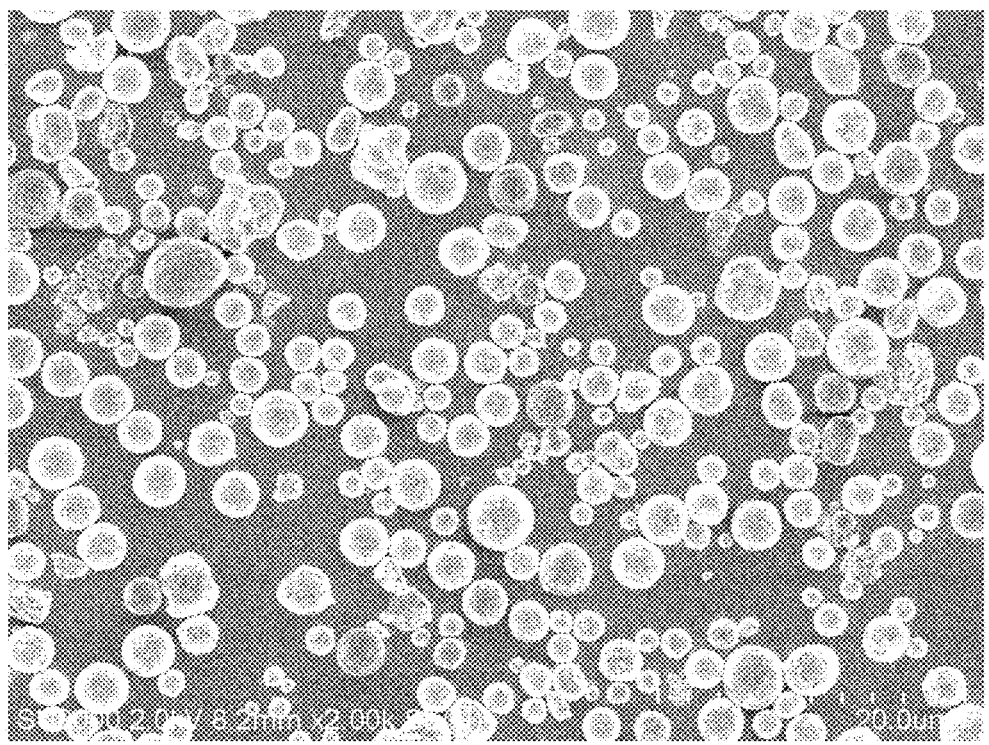
FIG. 5A is a scanning-electron-microscope (or SEM) photograph (magnification×2,000) showing the results of observing a test sample according to First Example described in the "EXAMPLES" section.
Figure 5B:
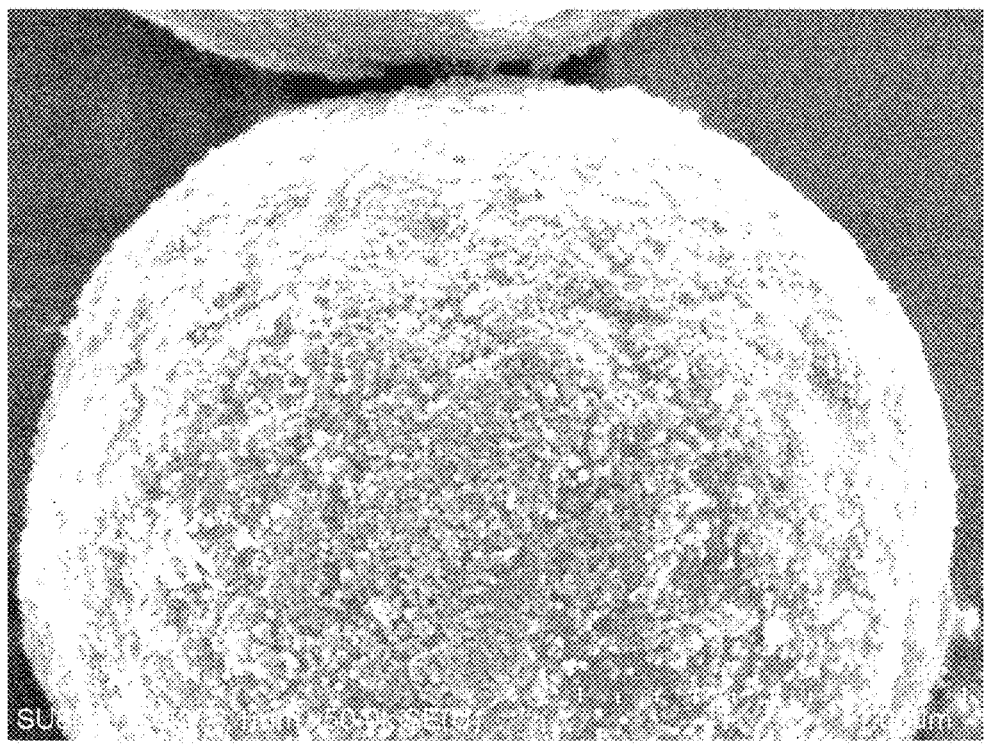
FIG. 5B is another SEM photograph (magnification×50,000) showing the results of observing the test sample according to First Example described in the "EXAMPLES" section.
Figure 6A:
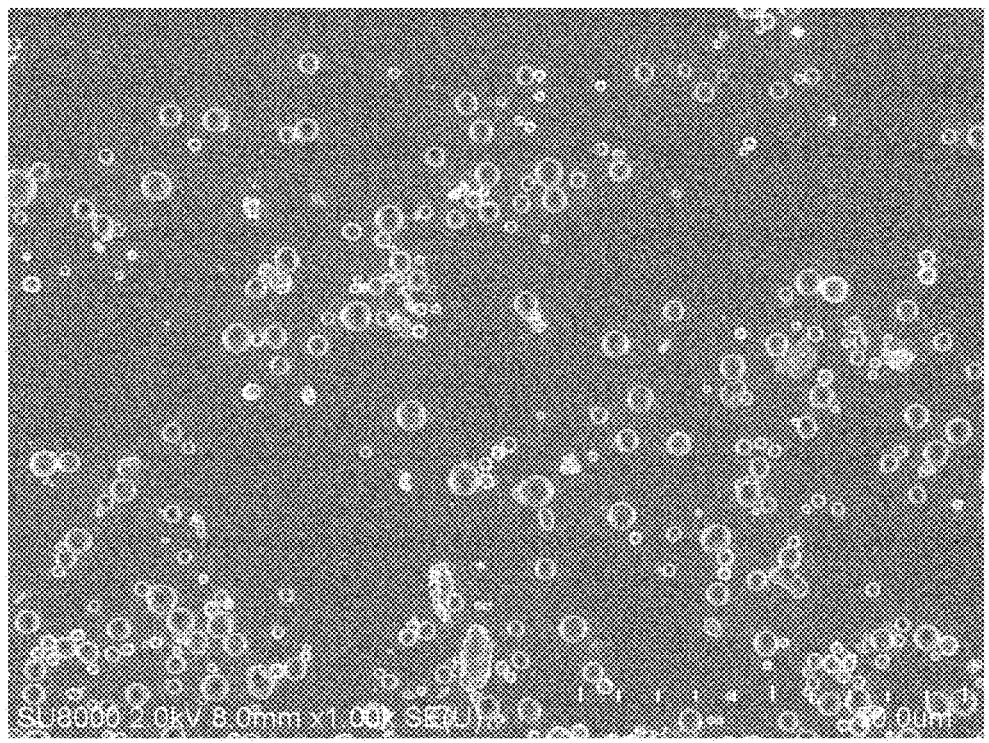
FIG. 6A is an SEM photograph (magnification×1,000) showing the results of observing a test sample according to First Comparative Example described in the "EXAMPLES" section.
Figure 6B:
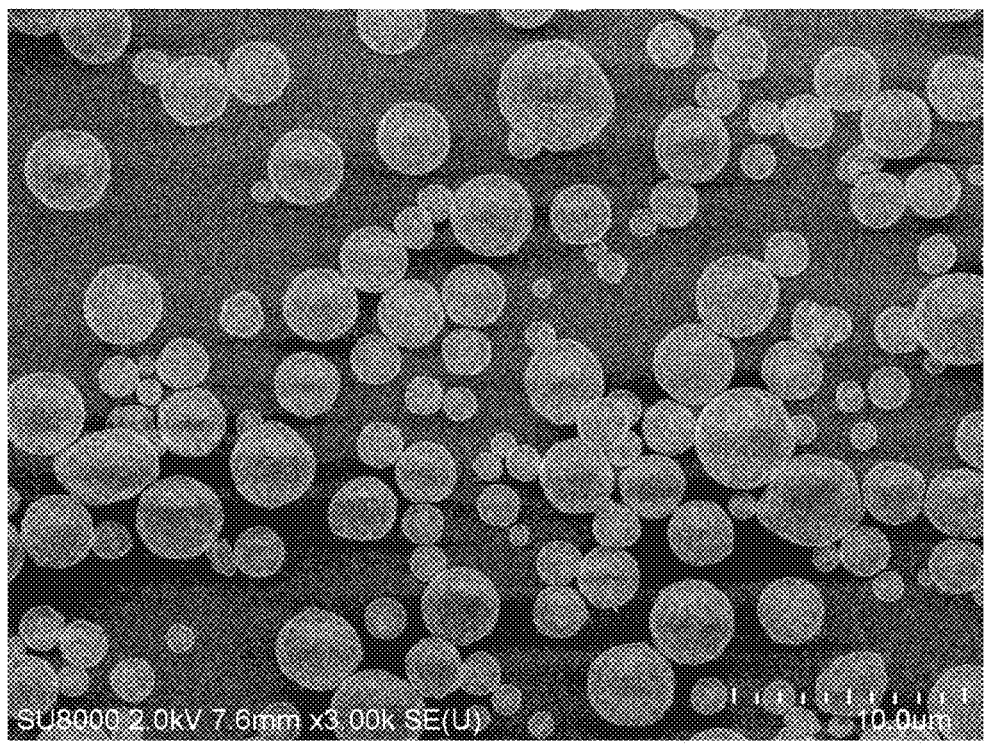
FIG. 6B is another SEM photograph (magnification×3,000) showing the results of observing the test sample according to First Comparative Example described in the "EXAMPLES" section.
Figure 6C:
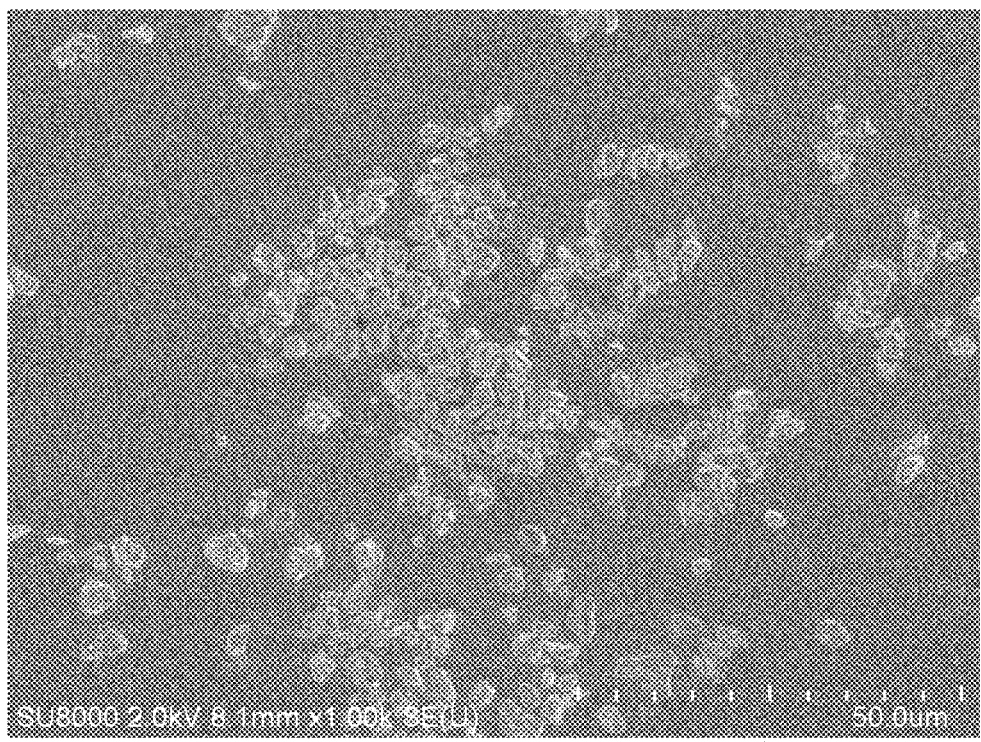
FIG. 6C is an SEM photograph (magnification×1,000) showing the results of observing a test sample according to Third Comparative Example described in the "EXAMPLES" section.
Figure 6D:
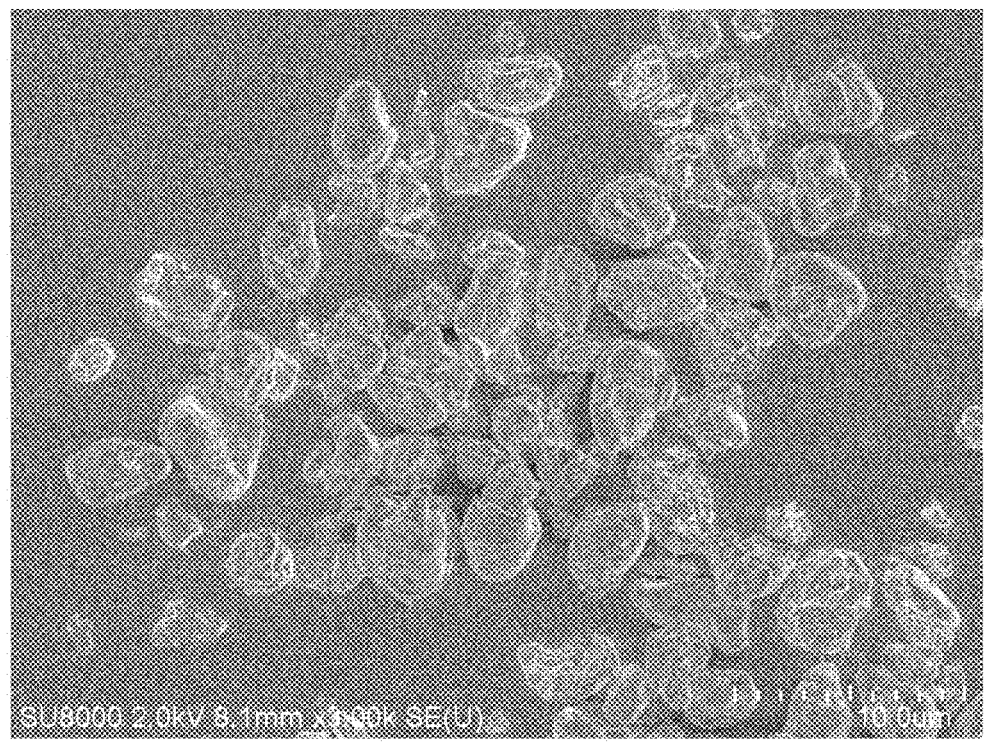
FIG. 6D is another SEM photograph (magnification×3,000) showing the results of observing the test sample according to Third Comparative Example described in the "EXAMPLES" section.

It is found clearly from FIGS. 5A and 5B that the test sample (i.e., the composite particulate material) according to First Example had a configuration approximating a true sphere whose degree of sphericity was 0.96, and comprised the inorganic particulate material dispersed uniformly and joined to the resinous particulate material on the surface. In contrast, as can be seen clearly from FIGS. 6C and 6D, the test sample according to Third Comparative Example (i.e., the resinous particulate material itself before undergoing the fuse welding step) was found to have a distorted configuration whose degree of sphericity was 0.67. However, FIGS. 6A and 6B showing the results produced by the test sample according to First Comparative Example suggest that subjecting the test sample according to Third Comparative Example to the fuse welding step will upgrade the degree of sphericity. A reason for this can be speculated that the heating at the fuse welding softens the resinous particulate material to upgrade the degree of sphericity. Moreover, the speculation is also supported by FIGS. 6A and 6B produced by First Comparative Example in which the resinous particulate material according to First Example itself, which was independently subjected to the fuse welding step, exhibited a heightened degree of sphericity of 0.96.

(iv) Evaluation on Peel Strength

(iv)-1 Preparation of Varnish 64 parts by mass of each of the composite particulate materials according to First Example and First Comparative Example was wet mixed with 150 parts by mass of MEK, thereby obtaining 214 parts by mass of a dispersion liquid. To each of 214 parts by mass of the resulting dispersion liquids, the following were added and mixed with each other: 150 parts by mass of MEK; 100 parts by mass of a cresol novolac-type epoxy resin ("YDCN-704" produced by SHIN NITTETSU SUMI-KIN KAGAKU Co., Ltd.); 50 parts by mass of a phenol novolac-type epoxy resin ("PSM-4261" produced by GUN-EI KAGAKKU KOGYO Co., Ltd.); and 0.1 parts by mass of an imidazole-based curing accelerator ("CURESOL 2E4MZ" produced by SHIKOKU KASEI KOGYO Co., Ltd.). Thus, two varnishes were prepared in an amount of about 514 parts by mass as test samples according to First Embodiment and First Comparative Example for evaluating the peel strength.

(iv)-2 Trial Preparation of Sample for Measuring Peel Strength

Glass cloths were impregnated with the varnishes prepared as above, and were then dried naturally. Thereafter, the dried glass clothes were heated at 130° C. in a hot-wind circulation oven for 10 minutes, and were further heated at 150° C. for three minutes. Thus, semi-cured pre-pregs were obtained. The pre-pregs were overlapped each other in a quantity of 8 pieces, respectively. Moreover, the stacked pre-pregs were held respectively between two copper foils, and were then subjected to vacuum pressing performed under conditions described below.

To prepare a cured product, the vacuum pressing was carried out using a type "IMC-IAEA" vacuum pressing machine whose molding pressure was set at about 2 MPa, and whose molding temperature was raised from 50° C. to 170° C. at a temperature increment rate of 5° C./min and was retained at 170° C. for 20 minutes after the temperature increase.

(iv)-3 Measurement of Peel Strength

The cured products (or copper foils with adhered resin) were measured for the 90-deg. tear-off strength under below-described conditions with reference to JIS K6584-1. The measurement was carried out under the following conditions: the use of a type 5582 universal material tester serving as a measurement device; a testing temperature set at 23° C.; a testing rate set at 50 mm/min; and a tear-off width set at 10 mm. Table 3 shows the results of the measurement. The test sample which used First Example comprising the fuse welded silica was found to exhibit a higher peel strength than did the test sample which used Second Comparative Example comprising the mechanochemically embedded silica. The advantage is believed to result from the fuse welding step carried out to upgrade the adhesiveness between silica (i.e., the inorganic particulate material) and PTFE (i.e., the resinous particulate material); and OH groups arising in silica in the surface to upgrade the adhesiveness between silica and copper foil as well as the adhesiveness between silica and PTFE.

TABLE 3

| | | 1st Ex. | 2nd Comp. Ex. |
|---|---|---|---|
| Composition | Cresol Novolac-type Epoxy Resin | 100 | 100 |
| | Phenol Novolac-type Epoxy Resin | 50 | 50 |
| | Imidasole-based Cure Accelerator | 0.1 | 0.1 |
| | 1st Ex. | 64 | |
| | 2nd Comp. Ex. | | 64 |
| Peel Strength (kN/m) | | 1.4 | 1.2 |

(v) Measurements of Specific Permittivity and Dielectric Tangent

The composite particulate materials according to First Example and Second Comparative Example, and the resinous particulate material according First and Third Comparative Examples were measured for the specific permittivity and dielectric tangent at 1 GHz by a cavity resonance perturbation technique with a network analyzer (e.g., "E5071C" produced by KEYSIGHT Corporation). The measurements were carried out with reference to ASTM D2520 (equivalent to JIS C2565). Table 4 shows the results of the measurements.

TABLE 4

| | Specific Permittivity | Dielectric Tangent |
|---|---|---|
| 1st Ex. | 2.13 | 0.0012 |
| 1st Comp. Ex. | 2.17 | 0.0002 |

TABLE 4-continued

|  | Specific Permittivity | Dielectric Tangent |
|---|---|---|
| 2nd Comp. Ex. | 2.31 | 0.0027 |
| 3rd Comp. Ex. | 2.25 | 0.0006 |

As can be apparent from Table 4, it was found that performing both of covering the surface of the resinous particulate material with the inorganic particulate material and carrying out the fuse welding step allows the specific permittivity to lower, because the composite particulate material according to First Example exhibited a lower specific permittivity than did the composite particulate material according to Second Comparative Example and the resinous particulate material according First and Third Comparative Examples.

Moreover, comparison between First Example and First Comparative Example, and comparison between the Second Comparative Example and Third Comparative Example clarified that the presence of the inorganic particulate material raises the dielectric tangent. However, note that First Example and First Comparative Example correspond to Second Comparative Example and Third Comparative Example respectively. Specifically, Second Comparative Example was substantially identical with First Example other than that no fuse welding step was carried out, and Third Comparative Example was substantially identical with First Comparative Example other than that no fuse welding step was carried out. Then, comparing First Example with Second Comparative Example, and comparing First Comparative Example with Third Comparative Example clarified that involving the fuse welding step effects an advantage of inhibiting the dielectric tangent from rising. That is, the fuse welding step was found to effectively inhibit the rise of the dielectric constant resulting from mixing the inorganic particulate material, because First Example and First Comparative Example undergone the fuse welding step exhibited a smaller dielectric tangent than did Second Comparative Example and Third Comparative Example that corresponded to First Example and First Comparative Example respectively but did not undergo the fuse welding step.

What is claimed is:

1. A composite particulate material comprising:
   a resinous particulate material comprising a fluorine resin having C—F bonds and being capable of softening or melting when being heated; and
   an inorganic particulate material having a particle diameter being smaller than a particle diameter of the resinous particulate material, fuse welded so as to be uniformly arranged only on a surface of the resinous particulate material, and turned into being hydrophobic by a surface treatment;
   the composite particulate material satisfying conditions (a), (b) and (c) below:
   (a) the composite particulate material exhibits a degree of sphericity of 0.8 or more;
   (b) the composite particulate material has a volumetric average particle diameter of from 0.1 to 100 μm; and
   (c) the inorganic particulate material has OH groups in an amount of from 0.1 to 30 μmol/m$^2$ in a surface thereof coming in contact with the resinous particulate material.

2. The composite particulate material according to claim 1, wherein the inorganic particulate material comprises one member selected from the group consisting of an inorganic oxide composed of silica, alumina, zirconia or titania, and a composite oxide composed of at least two members selected from the group consisting of silica, alumina, zirconia and titania.

3. The composite particulate material according to claim 1, wherein the composite particulate material is undergone a surface treatment with one or more compounds selected from the group consisting of a silane compound, an organosilazane, and an organic compound having an amino group.

4. The composite particulate material according to claim wherein the composite particulate material is free of any observable sea-island structure when one observes a slurry in which the composite particulate material is dispersed in a concentration of 20% by mass in methyl ethyl ketone with an optical microscope.

5. The composite particulate material according to claim wherein a content of inorganic particulates is 1 mg/m$^2$ or more after being mixed in an amount of 100 g in 200-mL methyl ethyl ketone and then undergoing a washing operation specified in (A) below three times:
   (A) irradiating with an ultrasonic wave with 40 kHz in frequency and 600 W in output for five minutes; separating with 10,000-rpm centrifugal separation for five minutes; and collecting deposits.

6. The composite particulate material according to claim 1, wherein a washed product, which is the composite particulate material after undergoing a washing operation specified in (A) below three times, is capable of re-dispersing in methyl ethyl ketone:
   (A) irradiating with an ultrasonic wave with 40 kHz in frequency and 600 W in output for five minutes; separating with 10,000-rpm centrifugal separation for five minutes; and collecting deposits.

7. The composite particulate material according to claim 1 wherein a linseed-oil feed amount is 30 g/100 g or less.

8. A composite-particulate-material slurry comprising:
   the composite particulate material according to claim 1; and
   an organic solvent dispersing the composite particulate material.

9. A composite particulate material-containing resinous composition comprising:
   the composite particulate material according to claim 1; and
   a prior-to-polymerization resinous material dispersing the composite particulate material.

10. A production process for a composite particulate material, the production process comprising:
    a fuse welding step of charging a resinous particulate material comprising a fluorine resin having C—F bonds and being capable of softening or melting when being heated and an inorganic particulate material having a particle diameter being smaller than a particle diameter of the resinous particulate material and being turned to be hydrophobic by a surface treatment into a high-temperature atmosphere comprising a gas whose temperature is a melting point or more of the resinous particulate material while floating the resinous particulate material and inorganic particulate material in a manner of disintegrating from each other in a medium comprising a gas under a condition where the inorganic particulate material exists on a surface of the resinous particulate material, thereby generating OH groups in a surface of the inorganic particulate material and then fuse welding the inorganic particulate material onto the surface of the resinous particulate material;

the fuse welding step bringing the resinous particulate material into contact with the high-temperature atmosphere until a produced composite particulate material exhibits a degree of sphericity of 0.8 or more.

11. A production process for a composite particulate material, the production process comprising:

a fuse welding step of charging a resinous particulate material comprising a fluorine resin having C—F bonds and being capable of softening or melting when being heated and an inorganic particulate material having a particle diameter being smaller than a particle diameter of the resinous particulate material, into a high-temperature atmosphere comprising a gas whose temperature is a melting point or more of the resinous particulate material while floating the resinous particulate material and inorganic particulate material in a manner of disintegrating from each other in a medium comprising a gas under a condition where the inorganic particulate material exists on a surface of the resinous particulate material, thereby generating OH groups in a surface of the inorganic particulate material and then fuse welding the inorganic particulate material onto the surface of the resinous particulate material;

the fuse welding step bringing the resinous particulate material into contact with the high-temperature atmosphere until a produced composite particulate material exhibits a degree of sphericity of 0.8 or more; and the inorganic particulate material comprising an inorganic particle with a first functional group expressed by formula (1): —OSiX$^1$X$^2$X$^3$ and a second functional group expressed by formula (2): —OSiY$^1$Y$^2$Y$^3$, both of the first and second functional groups being bonded with a surface of the inorganic particle, wherein, in formulas (1) and (2):

X$^1$ is a phenyl group, a vinyl group, an epoxy group, a methacrylate group, an amino group, a ureido group, a mercapto group, an isocyanate group, or an acrylic group;

each of X$^2$ and X$^3$ is one member independently selected from the group consisting of —OSiR$_3$ and —OSiY$^4$Y$^5$Y$^6$;

Y$^1$ is R;

each of Y$^2$ and Y$^3$ is one member independently selected from the group consisting of R and —OSiY$^4$Y$^5$Y$^6$;

Y$^4$ is R;

each of Y$^5$ and Y$^6$ is one member independently selected from the group consisting of R and —OSiR$_3$;

each R is independently an alkyl group whose number of carbon atoms is from 1 to 3; and each of X$^2$, X$^3$, Y$^2$, Y$^3$, Y$^5$ and Y$^6$ optionally bonds with any of adjacent X$^2$, X$^3$, Y$^2$, Y$^3$, Y$^5$ and Y$^6$ through —O.

12. The production process according to claim 10, wherein the high-temperature atmosphere has a temperature of 400° C. or more.

13. The production process according to claim 10, wherein the inorganic particulate material comprises one member selected from the group consisting of an inorganic oxide composed of silica, alumina, zirconia or titania, and a composite oxide composed of at least two members selected from the group consisting of silica, alumina, zirconia and titania.

14. The production process according to claim 10, wherein the composite particulate material produced at the fuse welding step is free of any observable sea-island structure when one observes a slurry in which the composite particulate material is dispersed in a concentration of 20% by mass in methyl ethyl ketone with an optical microscope.

15. The production process according to claim 11, wherein the high-temperature atmosphere has a temperature of 400° C. or more.

16. The production process according to claim 11, wherein the inorganic particulate material comprises one member selected from the group consisting of an inorganic oxide composed of silica, alumina, zirconia or titania, and a composite oxide composed of at least two members selected from the group consisting of silica, alumina, zirconia and titania.

17. The production process according to claim 11, wherein the composite particulate material produced at the fuse welding step is free of any observable sea-island structure when one observes a slurry in which the composite particulate material is dispersed in a concentration of 20% by mass in methyl ethyl ketone with an optical microscope.

* * * * *